(12) United States Patent
Catlin et al.

(10) Patent No.: US 7,182,869 B2
(45) Date of Patent: Feb. 27, 2007

(54) FUEL FILTER ARRANGEMENT

(75) Inventors: Dennis J. Catlin, Cass City, MI (US);
Bryan J. Gettel, Pigeon, MI (US);
Ronald B. Kuenzli, Deford, MI (US);
Glenn A. Moss, Cass City, MI (US);
Joseph M. Ross, Millington, MI (US);
Edward J. Talaski, Caro, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 224 days.

(21) Appl. No.: 10/960,812

(22) Filed: Oct. 7, 2004

(65) Prior Publication Data

US 2006/0076287 A1 Apr. 13, 2006

(51) Int. Cl.
*B01D 35/027* (2006.01)
*F02M 37/22* (2006.01)
(52) U.S. Cl. ............................ 210/416.4; 210/416.1; 210/315; 210/489; 55/482
(58) Field of Classification Search ................ 210/314, 210/315, 416.1, 416.4, 483, 484, 488, 489; 55/482, 486
See application file for complete search history.

(56) References Cited

U.S. PATENT DOCUMENTS

| | | | |
|---|---|---|---|
| 4,250,039 A * | 2/1981 | Cozzi et al. ............. 210/416.5 |
| 4,279,232 A | 7/1981 | Schuster et al. |
| 4,561,977 A * | 12/1985 | Sasaki ........................ 210/356 |
| 4,637,351 A * | 1/1987 | Pakula ...................... 123/25 J |
| 4,684,463 A * | 8/1987 | Mizusawa ................... 210/172 |
| 4,922,959 A | 5/1990 | Sasaki et al. |
| 5,494,575 A * | 2/1996 | Kitajima et al. ............ 210/168 |
| 5,547,568 A * | 8/1996 | Sasaki ........................ 210/172 |
| 5,584,988 A | 12/1996 | Hashimoto et al. |
| 5,728,292 A | 3/1998 | Hashimoto et al. |
| 6,343,589 B1 * | 2/2002 | Talaski et al. ............. 123/514 |
| 6,706,183 B2 * | 3/2004 | Ito et al. .................. 210/416.1 |

FOREIGN PATENT DOCUMENTS

DE 10 2004 042 245 A1 * 3/2006
JP 7-256016 A * 10/1995

* cited by examiner

*Primary Examiner*—Fred G. Prince
(74) *Attorney, Agent, or Firm*—Reising, Ethington, Barnes, Kisselle, P.C.

(57) ABSTRACT

A fuel filter and vapor separator arrangement having at least one layer of liquid fuel permeable material defining at least one substantially enclosed cavity. The permeable material has at least one opening to provide fluid communication of liquid fuel within the cavity with an inlet of a high pressure fuel pump outside the cavity. A jet pump and/or fuel vapor vent is arranged relative to the cavity to facilitate the elimination of fuel vapor flowing to the high pressure fuel pump.

44 Claims, 6 Drawing Sheets

FUEL FILTER ARRANGEMENT

FIELD OF THE INVENTION

This invention relates generally to volatile fuel systems fuel filters, and more particularly to fuel filter and vapor separator arrangement for use with fuel pumps in fuel tanks.

BACKGROUND OF THE INVENTION

Fuel tanks in vehicles typically have a high pressure fuel pump within the fuel tank for supplying fuel to an engine of the vehicle. While in use, the engine is generally unable to utilize all the fuel supplied by the high pressure pump. Accordingly, some vehicles have been equipped with a return fuel line to redirect the unused fuel back to the fuel tank for recirculation. The returned fuel generally has been heated, and results in forming vapor bubbles when discharged into the fuel tank. The presence of vapor bubbles in the fuel tank is undesirable, particularly if the vapor bubbles are drawn into the high pressure fuel pump, which can negatively impact the efficiency of the fuel pump and the flow rate of fuel delivered to the engine.

Various attempts have been made to eliminate the opportunity for vapor bubbles to enter the fuel pump. In U.S. Pat. No. 5,728,292 to Hashimoto et al, fuel returning from an engine is directed into a return fuel chamber of a fuel filter. The return fuel chamber is constructed of a meshed filter material, wherein one wall of the return fuel chamber forms a common wall with a main filtration chamber. The return fuel chamber has an upper wall with a check valve allowing fuel vapor to exit through the check valve into the bulk fuel in the fuel tank. The returned fuel within the return fuel chamber is free to flow through the common wall and into the main filtration chamber for entry into the inlet of a high pressure fuel pump. In addition, fuel surrounding the main filtration chamber other than the fuel in the return fuel chamber is free to flow directly into the main filtration chamber and then to the inlet of the high pressure fuel pump. Accordingly, the fuel filter in the '292 patent relies on the common wall between the main filtration chamber and the return fuel chamber to separate fuel vapor from the fuel supply to the high pressure fuel pump, and thus, to the engine.

SUMMARY OF THE INVENTION

A fuel filter and vapor separator arrangement for use in a fuel tank of a vehicle has an outer layer of permeable material defining a substantially enclosed cavity, at least one opening through the outer layer, and a tubular wall that extends through an opening in the outer layer to provide an inlet located in the cavity and an outlet located outside the cavity that communicates with an inlet of a high pressure fuel pump. In one presently preferred embodiment, a jet nozzle is disposed adjacent to the outer layer, has an inlet for receiving fuel under pressure and has an outlet for dispensing fuel to inhibit fuel vapor from entering an inlet of the high pressure fuel pump. In another embodiment the jet pump aspirates fuel vapor away from the inlet of the high pressure fuel pump.

Some of the objects, features and advantages that may be included or achieved by one or more embodiments of this invention include improving the running efficiency of an engine of a vehicle, eliminating the flow of fuel vapor to a fuel pump, improving the hot fuel running performance of the pump, increasing the filtration capacity of a fuel filter, increasing the liquid fuel available to the engine, reducing the profile height of a filter arrangement, reducing the number of component parts within a fuel system, improving the efficiency in assembly of a fuel system, providing a filter arrangement of economical design, manufacture and assembly, and providing a filter arrangement having a long life in use.

BRIEF DESCRIPTION OF THE DRAWINGS

These and other objects, features and advantages will be apparent from the following detailed description of the preferred embodiments and best mode, appended claims and accompanying drawings, in which:

DETAILED DESCRIPTION OF THE PREFERRED EMBODIMENTS

Figure 1:
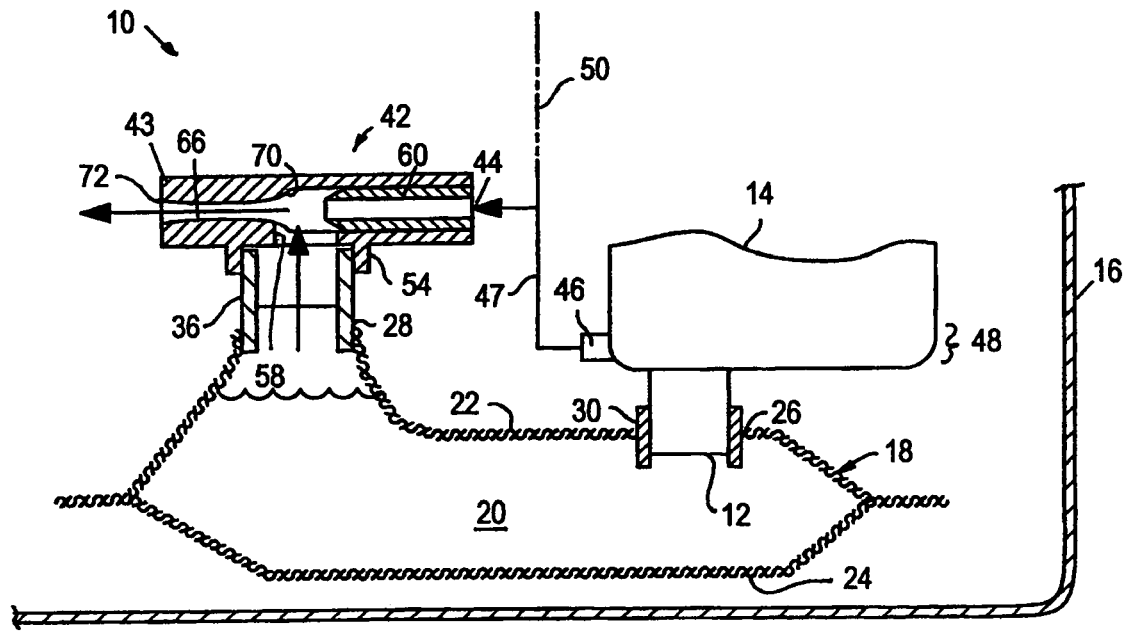
FIG. 1 is a partial cross-sectional side view of a fuel filter arrangement for use in a fuel tank in a vehicle constructed according to one embodiment of the invention.

Referring in more detail to the drawings, FIG. 1 illustrates a fuel filter arrangement 10 constructed according to one presently preferred embodiment of the invention and adapted to be connected to an inlet 12 of a high-pressure fuel pump 14 preferably driven by an electric motor and disposed within a fuel tank 16. The filter arrangement 10 facilitates the removal of fuel vapor from the liquid fuel adjacent the inlet 12 of the fuel pump 14. Accordingly, the fuel pump 14 is able to pump liquid fuel to an engine of a vehicle (not shown) efficiently to maximize the running performance of the vehicle engine and the fuel pump.

Still referring to FIG. 1, the filter arrangement 10 has at least one layer of liquid fuel permeable material, hereafter referred to as an outer layer 18 of permeable material, forming a substantially enclosed cavity 20. The outer layer 18 is preferably defined by a pair of walls sealed together about their periphery, preferably spaced apart otherwise, and referred to hereafter as an upper wall 22 and a lower wall 24. The outer layer 18 of liquid fuel permeable material may be constructed of a fine mesh or other porous material having a controlled porosity size permitting liquid fuel flow therethrough, but inhibiting contaminants and vapor bubbles larger than a predetermined size from flowing through the outer layer 18 and into the cavity 20. Preferably, the material has an average pore size less than about 100 microns, for example, and preferably in the range of about 20 to 80 microns. Preferably, the material is a woven material, such as woven nylon for example, and may be constructed as a single layer, though it should be recognized that multiple layers of material may be used in constructing the upper and lower walls 22, 24. It should also be recognized that any number of materials may be used to construct the upper and lower walls 22, 24, and that nylon is but one material that can be used.

The upper wall 22 has at least one opening, and is shown here as having a pair of openings 26, 28. An inlet connector 30 extends through one of the openings 26, may be generally tubular in form having a tubular wall, and is preferably attached or bonded within the opening 26 by an adhesive or hot weld joint, for example. The inlet connector 30 is preferably sized to be closely received on the inlet 12 of the high pressure fuel pump 14, and may be press fit thereon, or snap fit with appropriate tabs or latches, or hot welded or otherwise connected to the inlet 12.

A jet pump connector 36 which may be a cylindrical tube extends through the other opening 28 in the outer layer 18 and is desirably attached or bonded thereto in generally the same fashion as the inlet connector 30. The jet pump connector 36 is connected to a jet pump 42, such as by an appropriate friction fit, snap fit, bonding, hot welding or other suitable arrangement. To facilitate connecting the jet pump 42 to the connector 36, the jet pump 42 may include a depending annular flange 54.

The jet pump 42 has a body 43 with a high pressure inlet 44 that receives a driving fluid such as pressurized fuel to power the jet pump 42. The driving fluid may be provided through a fuel line 47 connected to or communicated with pressurized fuel discharged from the high pressure fuel pump 14. Desirably, the inlet 44 is communicated with an outlet 46 of the high pressure fuel pump 14, shown here as extending from a bottom or lower portion 48 of the fuel pump 14. It should be recognized that high pressure fuel flowing into the inlet 44 may originate from a location other than the outlet 46 of the fuel pump 14, such as from an auxiliary fuel line 50 operably connected for fluid communication with the high pressure fuel pump 14.

The jet pump 42 also preferably includes a low pressure inlet 58, a nozzle 60 and a venturi 66 generally aligned with the nozzle 60. The driving fluid (pressurized fuel in this embodiment) is received in the inlet 44 and flows through the nozzle 60 and is discharged by the nozzle 60 into the venturi 66. This flow of the driving fluid creates a pressure drop in the area of the low pressure inlet 58 tending to entrain or move fluid from the cavity 20 into the jet pump 42. The entrained fluid joins and flows through the venturi 66 with the driving fluid discharged from the nozzle 60. The venturi 66 may include a converging inlet 70 and/or a diverging outlet 72. The jet nozzle 60 may be secured in the body 43 by, for example, an adhesive, a weld joint or a friction fit, or the jet nozzle 60 may be formed integrally as one piece (not shown) with the body 43. The venturi 66 is shown being formed as one piece with the body 43 of the jet pump 42, though it should be recognized that the venturi 66 could be constructed as a separate component (not shown), and thereafter assembled in the body 43 with an adhesive, weld joint, or press fit, for example.

In use, fuel vapor within the cavity 20 will generally flow toward or collect adjacent to the upper wall 22 and migrate toward the jet pump inlet 58 since it is located generally vertically above the fuel pump inlet 12 when in a normal position in the fuel tank 16. When pressurized fuel is delivered to the jet pump 42, the pumping action of the jet pump 42 will draw at least some of the fuel vapor in the cavity 20 away from the inlet 12 of the high pressure fuel pump 14. This inhibits or reduces the flow rate or amount of fuel vapor that enters or is ingested by the high pressure fuel pump 14 and thus, reduces losses in the flow rate of fuel that is pumped to the engine of the vehicle. As such, the high pressure fuel pump 14 is able to pump liquid fuel more efficiently, and provide a more consistent flow of liquid fuel to the engine. Further, the jet pump 42 may aid in moving or drawing fuel into the cavity 20 where that fuel is immediately available to the high pressure fuel pump 14.

Figure 2:
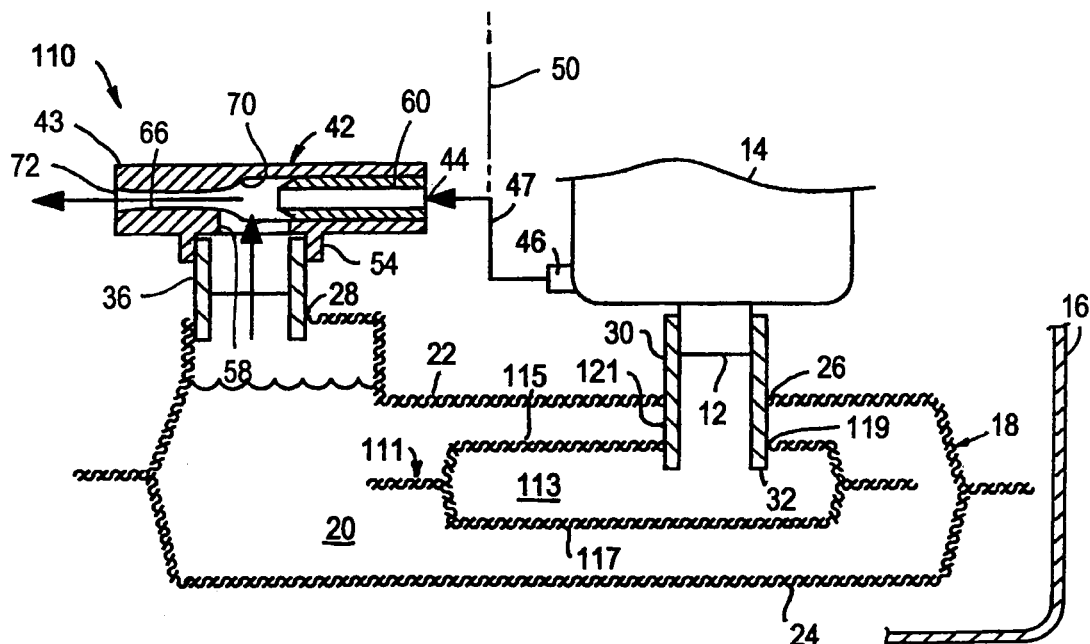
FIG. 2 is a partial cross-sectional side view of a fuel filter arrangement constructed according to a second embodiment of the invention.

Referring to FIG. 2, a second embodiment of a filter arrangement 110 is shown, wherein the same reference numerals are used to describe like components as in the embodiment above. The fuel filter arrangement 110 is similar to the first embodiment fuel filter arrangement 10 described above, however, the arrangement has a second or inner layer 111 of permeable material defining another substantially enclosed cavity 113 within the cavity 20. The inner layer 111 of material has at least one and is shown here as having a pair of generally spaced walls, referred to hereafter as an upper wall 115 and a lower wall 117 connected about their peripheries. Desirably, the upper and lower walls 115, 117 are spaced inwardly from the upper and lower walls 22, 24 of the outer layer 18 of material and are fully encapsulated by the outer layer 18, though the lower wall 117 can be provided having at least a portion located substantially at a lowermost point of the outer layer 18. The porosity of the inner layer 111 of material preferably is greater or larger in size than the porosity of the outer layer 18. Accordingly, the degree of filtration for the liquid fuel can be controlled by the careful selection of the relative porosities of the materials used in constructing the inner and outer layers 111, 18 of filter material. By having a larger porosity for the inner layer 111 than for the outer layer 18, the tendency for vapor to form as liquid fuel flows through the upper and lower walls 115, 117 is reduced. Additionally, a capillary seal is desirably provided by the upper and lower walls 115, 117 to inhibit vapor from flowing through the inner layer 111, thereby reducing the ingestion of vapor by the fuel pump 14. Further, the capillary action provided by the upper and lower walls 115, 117 desirably enhances priming the fuel pump 14 with liquid fuel, particularly in low fuel level conditions, sometimes referred to as "wicking". As such, any vapor within the cavity 20 is inhibited from flowing into the fuel pump 14, and is desirably evacuated from the cavity 20 via the jet pump 42.

The inlet connector 30 extends through the opening 26 in the outer layer 18 of material and an opening 119 in the inner layer 111 of material and is preferably attached to the layers of material 18, 111 by an adhesive or weld joint, for example. A free end 32 of the inlet connector 30 preferably extends into the cavity 113 defined by the inner layer 111 of material so that the cavity 113 is communicated with the inlet 12 of the high pressure pump 14 through the inlet connector 30. The inlet connector 30 preferably has a solid or continuous outer surface 121 that does not permit fuel flow therethrough. Accordingly, liquid fuel must flow into the cavity 113 defined by the inner layer 111 of material prior to entering the inlet connector 30. Therefore, in order for liquid fuel to enter the inlet 12 of the high pressure fuel pump 14, the liquid fuel must pass through both the outer and inner layers 18, 111, respectively, of filter material. As such, the liquid fuel gets filtered twice and any fuel vapor is separated by both layers 18 and 111 before it is ingested by the high pressure fuel pump 14 and pumped to the vehicle engine. Otherwise, the filter arrangement 110 functions similarly to the arrangement 10 described above, and thus is not described further.

Figure 3:
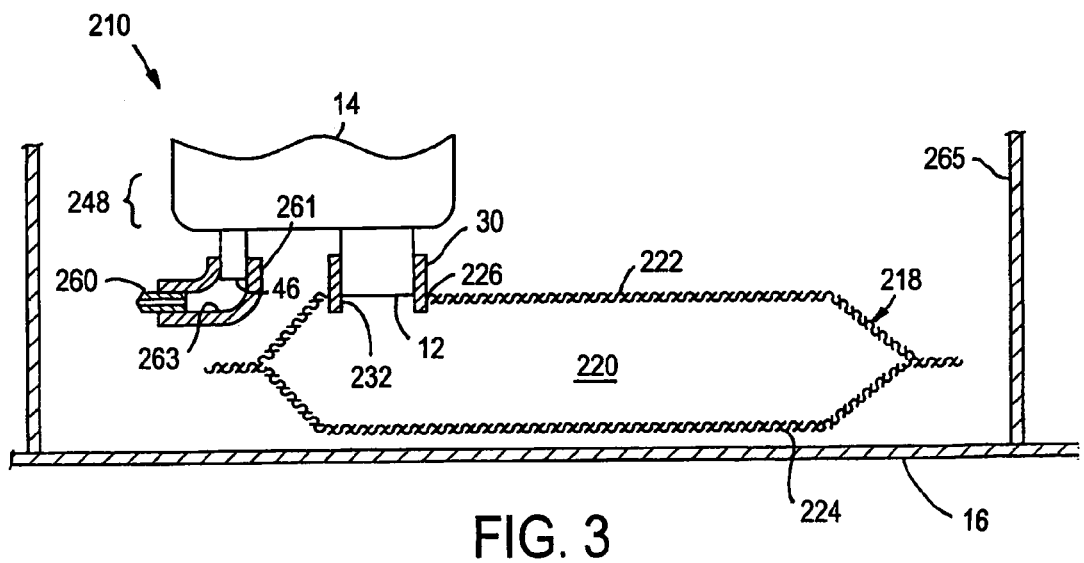
FIG. 3 is a partial cross-sectional side view of a fuel filter arrangement constructed according to a third embodiment of the invention.

In FIG. 3, a third embodiment of a filter arrangement 210 is shown, wherein the same reference numerals are used to describe like components as in the embodiments above. The filter arrangement 210 has an outer layer 218 of filter material defining a cavity 220 therein. The outer layer 218 has an upper wall 222 and a lower wall 224 with an opening 226 extending through the upper wall 222. The inlet connector 30 extends through the opening 226 to present an inlet 232 generally inside the cavity 220. The outer layer 218 of material is constructed from filter material having the desired porosity, as described above in the previous embodiments, to inhibit fuel vapor bubbles from flowing therethrough and into the cavity 220.

To further inhibit fuel vapor from entering the cavity 220, the high pressure fuel pump 14 has an outlet 46 arranged to agitate any fuel vapor generally adjacent the inlet 12, thereby causing the fuel vapor to move generally away from the inlet 12. The outlet 46 preferably extends from a bottom or lower portion 248 of the high pressure fuel pump 14 and is arranged for communication with a jet nozzle 260. A generally L-shaped tubular body or elbow 261 has a passage 263 sized for attachment to the outlet 46 and for receipt of the jet nozzle 260 therein. It should be recognized that any suitable mechanism for attachment of the tubular body 261 to the outlet 46 can be used, such as a press fit, for example. Similarly, it should be recognized that the jet nozzle 260 is suitably sized for secure attachment within the passage 263 of the tubular body 261, such as through the use of an adhesive, a weld joint, or a press fit, for example.

In use, pressurized fuel is discharged through the outlet 46 of the high pressure fuel pump 14 and out the jet nozzle 260 that is preferably oriented facing away from the inlet 12 of the high pressure fuel pump 14. Therefore, as pressurized fuel exits the jet nozzle 260, the surrounding liquid fuel and fuel vapor is agitated and directed generally away from the inlet 12 of the high pressure fuel pump 14. In turn, the fuel vapor suspended within the liquid fuel is caused to rise to a surface of the liquid fuel and away from the inlet 12 of the high pressure fuel pump 14. Desirably, to maintain liquid fuel around the inlet 12 of the high pressure fuel pump 14, and to baffle or control the flow of fuel in that area, a swirl pot 265 can be incorporated in the fuel tank 16 generally surrounding the fuel filter arrangement 210.

Figure 4:
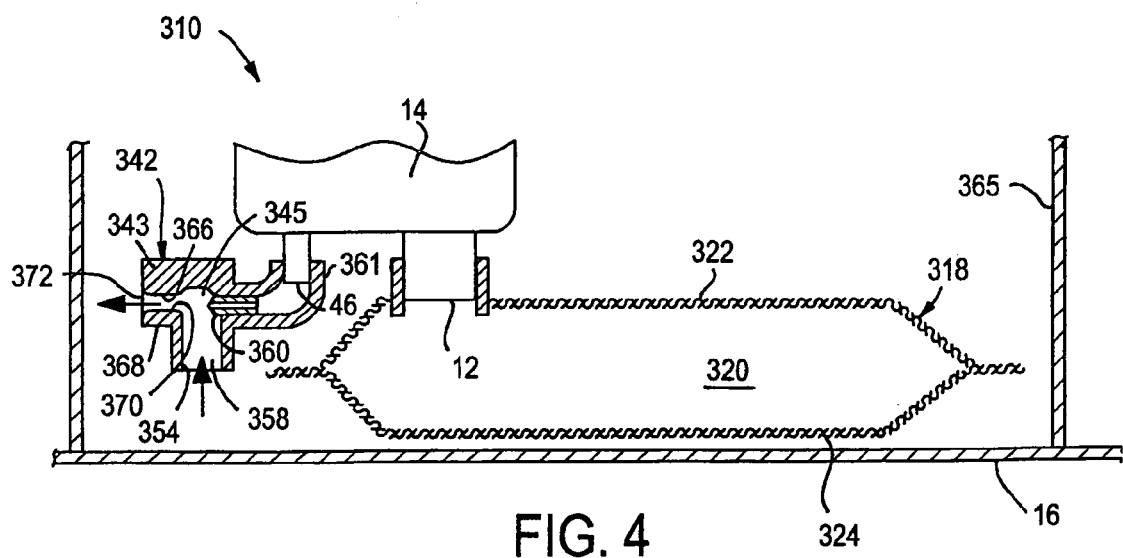
FIG. 4 is a partial cross-sectional side view of a fuel filter arrangement constructed according to a fourth embodiment of the invention.

In FIG. 4, a fourth embodiment of a fuel filter arrangement 310 is shown, wherein similar reference numerals are used to describe like components as in the embodiments above, however the reference numerals are offset by a factor of 300.

The fuel filter arrangement 318 has generally the same features as the filter arrangement 218 shown in FIG. 3, and therefore the discussion is limited hereafter to the addition of a jet pump 342 having a venturi 366 downstream from a jet nozzle 360. The jet pump 342 has a body 343 preferably formed as one piece with a tubular extension or elbow 361 extending from the venturi 366 for carrying the jet nozzle 360. Desirably, the elbow 361 is arranged for direct attachment to a high pressure fuel pump outlet 46. The venturi 366 preferably has a necked down or converging inlet 370 in axially spaced alignment downstream from the jet nozzle 360 and a diverging outlet 372. The body 343 has an inlet 354 extending generally laterally therefrom having an opening 358 in fluid communication with a through passage 345 of the jet pump 342.

In use, liquid fuel is discharged under pressure from the outlet 46 of the high pressure fuel pump 14 into the jet nozzle 360. The high pressure fuel flows through the jet nozzle 360 and into the venturi inlet 370 and a reduced pressure is created generally in the area of the inlet 354. The reduced pressure causes fluid in the area of the inlet 354 to flow through the inlet 354 and into the venturi 366, where this fluid mixes and flows with the fuel discharged from the nozzle 360. The fuel then flows through an outlet 372 of the jet nozzle 342 facing generally away from the inlet 12 of the high pressure fuel pump 14. As such, the fuel exiting the outlet 372 agitates the fuel surrounding the outlet 372 to reduce the volatility of the fuel drawn into the inlet 12 of the high pressure fuel pump 14, thereby allowing the high pressure fuel pump 14 to pump fuel with reduced cavitation losses and little or no fuel vapor therein.

Figure 5:
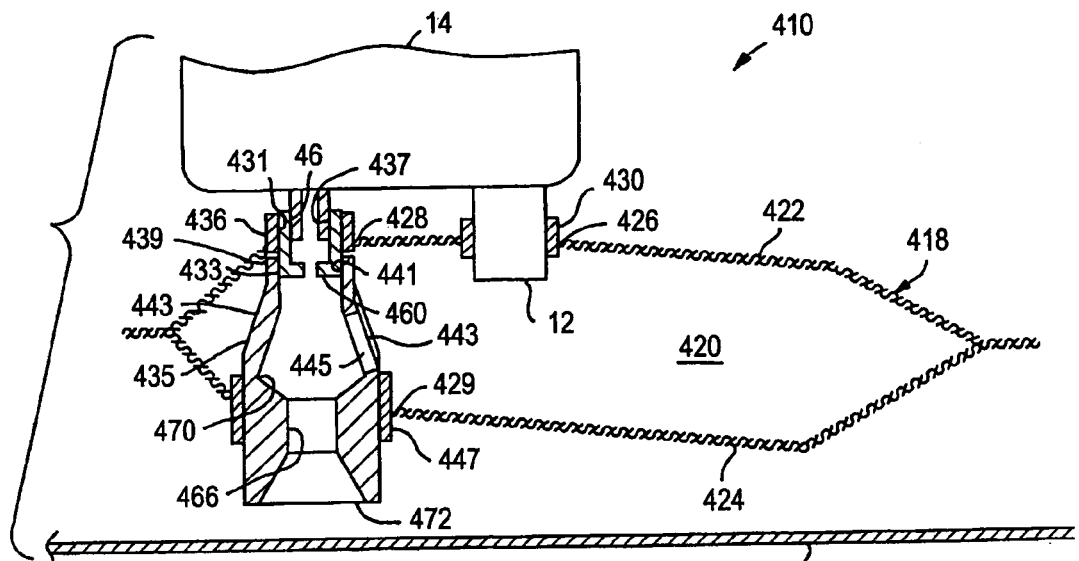
FIG. 5 is a partial cross-sectional side view of a fuel filter arrangement constructed according to a fifth embodiment of the invention.

In FIG. 5, a fifth embodiment of a fuel filter arrangement 410 is shown, wherein similar reference numerals are used to describe like components as in the embodiments above, however the reference numerals are offset by a factor of 400.

The fuel filter arrangement 410 has an outer layer 418 of liquid fuel permeable material defining a cavity 420 having an upper wall 422 and a lower wall 424. The upper wall 422 has a pair of openings 426, 428 and the lower wall 422 has an opening 429. A generally tubular inlet connector 430 is received in one of the openings 426 and attached therein with an adhesive or weld joint, for example. The inlet connector 430 is arranged for operable attachment to an inlet 12 of a high pressure fuel pump 14. A jet pump connector 436 is received in the other opening 428 and attached therein in a generally similar fashion as the inlet connector 430.

The jet pump connector 436 has a bore 431 sized to receive a jet nozzle 460 therein. The jet nozzle 460 is preferably secured in the bore 431 of the jet pump connector 436. The jet nozzle 460 preferably extends into the cavity 420 beyond the jet pump connector 436 and has an outer surface 433 for attaching a venturi body 435 thereto. The jet nozzle 460 has a bore 437 preferably sized for attachment to a source of high pressure fuel, shown here as an outlet 46 of the high pressure fuel pump 14.

The venturi body 435 may be formed in one piece with a jet nozzle housing 439 having a bore 441 sized for secure attachment to the outer surface 433 of the jet nozzle 460. The body 435 has a plurality of ribs 443 extending axially from the housing 439 with spaces, windows or inlets 445 defined between the ribs 443. The ribs 443 preferably diverge radially outwardly from one another as they extend away from the jet nozzle housing 439 and terminate at a venturi 466 within the venturi body 435. The venturi 466 has an inlet 470 within the cavity 420, and extends through the opening 429 to an outlet 472. To facilitate operable attachment of the venturi body 435 to the lower wall 424, a generally tubular connector 447 sized for secure receipt of the venturi body 435 therethrough may be attached within the opening 429 to the lower wall 424.

In use, high pressure fuel is discharged through the outlet 46 of the high pressure fuel pump 14 and through the jet nozzle 460. The high pressure fuel flows into the venturi 466, thus, creating a reduced pressure in the area of the inlet 470 of the venturi 466. Accordingly, any fuel vapor within the cavity 420 is drawn or aspirated through the inlets 445 between the ribs 443 and into the flow of fuel discharged from the nozzle 460 and flowing through the venturi 466. The fuel vapor is thereafter carried through the venturi 466 and discharged outside the cavity 420 and generally away from the inlet 12 of the high pressure fuel pump 14. As a result, the high pressure fuel pump 14 receives liquid fuel essentially free from fuel vapor bubbles. Accordingly, the fuel pump 14 is able to pump liquid fuel efficiently to the engine of the vehicle.

Figure 6:
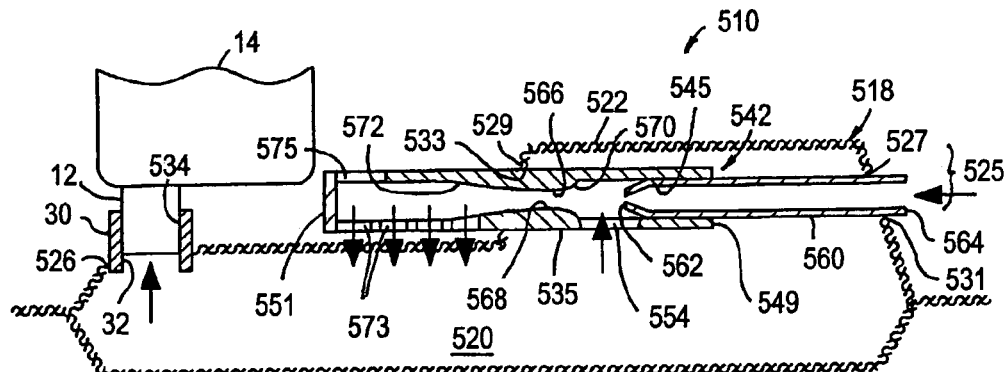
FIG. 6 is a partial cross-sectional side view of a fuel filter arrangement constructed according to a sixth embodiment of the invention.

In FIG. 6, a sixth embodiment of a filter arrangement 510 is shown with reference numerals offset by a factor of 500 being used to describe components similar to those in the embodiments already discussed. The filter arrangement 510 has an outer layer 518 of material with an upper wall 522 and a lower wall 524 defining a cavity 520 therein. Desirably, the upper wall 522 has a raised portion 525 presenting generally opposite side walls 527, 529 which have openings 531, 533 for receiving a jet pump 542 therein.

The jet pump 542 has a jet nozzle 560 attached to the wall 527 through one of the openings 531, such that an inlet 564 of the jet nozzle 560 is generally outside of the cavity 520, while an outlet 562 of the jet nozzle 560 is within the cavity 520 and generally facing the other opening 533. The jet pump 542 also has a body 535 with a passage 545 extending from one end 549 of the body 535 to another end 551 of the body 535. The passage 545 has a venturi section 566 that preferably has a necked down section or throat 568 between an inlet 570 and an outlet 572.

The venturi body 535 is preferably open at one end 549 to receive the outlet 562 of the jet nozzle 560 therein. The jet nozzle 560 is disposed in the venturi body 535 so that the outlet 562 of the jet nozzle 560 is axially spaced from and preferably axially aligned with the inlet 570 of the venturi 566. The body 535 has at least one inlet 554 extending through a side wall of the body 535 generally between the outlet 562 of the jet nozzle 560 and the inlet 570 of the venturi 566. Desirably, the inlet 554 is open to the cavity 520 and is preferably oriented to face generally in the direction of the lower wall 524 of the filter material.

The body 535 preferably extends outside of the cavity 520 through the opening 533. A plurality of outlet ports 573 pass through the side wall of the body 535 and are generally oriented to face the upper wall 522 of the filter material. The venturi body 535 also has a vapor and fuel outlet 575 generally adjacent its end 551. The vapor and fuel outlet 575 is preferably oriented to face away from the upper wall 522 of the filter material.

The upper wall 522 has another opening 526 for receiving an inlet connector 30 therein. The inlet connector 30 is desirably attached to the upper wall 522 with the use of adhesive or weld joint, for example. The inlet connector 30 has an outlet 534 sized for operable attachment to an inlet 12 of a high pressure fuel pump 14, and an open free end 32.

In use, the jet nozzle 562 receives liquid fuel under pressure from a source of high pressure fuel, such as the high pressure fuel pump 14, for example, with liquid fuel being discharged through the outlet 564 of the jet nozzle 560. As the fuel flows from the jet nozzle 560 through the venturi 566, a low or reduced pressure is established in the area of the inlet 570 of the venturi 566. Accordingly, any fuel vapors within the cavity 520 enter or are aspirated through the inlet 554 and are then carried with the liquid fuel discharged from the nozzle 560 through the venturi 566 and out the outlet 572 of the venturi 566. As the liquid fuel and fuel vapors exit the cavity 520 through the venturi 566, the liquid fuel is free to flow generally downward through the plurality of outlet ports 573 in the body 535 generally toward the upper wall 522 of filter material. The fuel vapors tend to rise and exit through the vapor outlet 575 in the body 552, and thus, the fuel vapors (usually with some liquid fuel) flow generally away from the filter arrangement 510, and thus away from the inlet 12 of the high pressure fuel pump 14.

Figure 7:
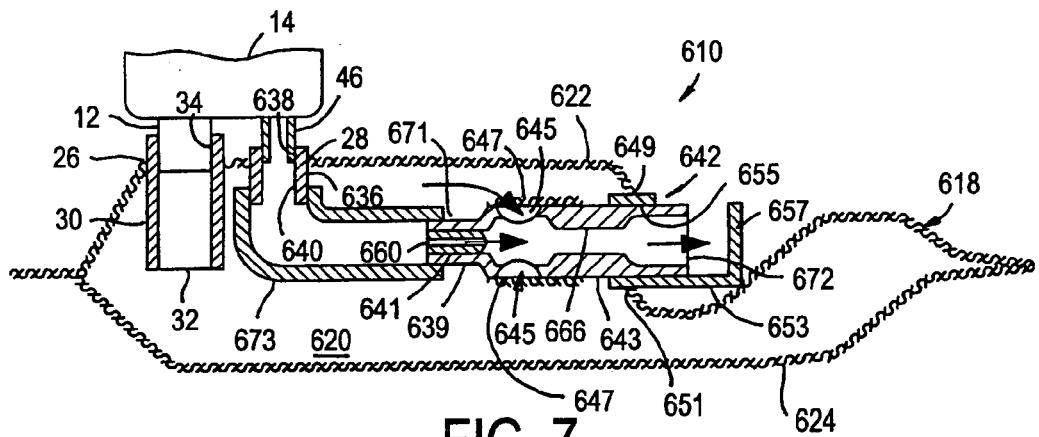
FIG. 7 is a partial cross-sectional side view of a fuel filter arrangement constructed according to a seventh embodiment of the invention.

In FIG. 7, a seventh embodiment of a filter arrangement 610 is shown with reference numerals offset by a factor of 600 being used to describe components similar to those in the embodiments already discussed. The filter arrangement 610 has an outer layer 618 of filter material having an upper wall 622 and a lower wall 624 defining a cavity 620 therein. The upper wall 622 has a pair of openings 26, 28 with an inlet connector 30 extending through the opening 26, and a jet pump connector 636 extending through the opening 28. The inlet connector 30 has an inlet end 32 extending into the cavity 620, and is attached at its other end 34 to an inlet 12 of the high pressure fuel pump 14. The jet pump connector 636 has an inlet 638 in communication with an outlet 46 of a high pressure fuel pump 14. The jet pump connector 636 has an outlet 640 within the cavity 620 and connected or leading to a jet pump 642.

The jet pump 642 has a body 643 with a venturi 666 and a jet nozzle 660 maintained within the body 643 in axial alignment upstream of the venturi 666. Desirably, to facilitate maintaining the jet nozzle 660 upstream of the venturi 666, the body 643 has a jet nozzle housing 639 formed as one piece with the body 643. The jet nozzle housing 639 has a bore 641 desirably sized to receive the jet nozzle 660 for secure attachment of the jet nozzle 660 within the bore 641. The jet nozzle housing 639 also has an outer surface 671 sized for operable attachment to an elbow 673 connected at one end to the connector 636 and at its other end to the body 643.

The body 643 has at least one, and desirably a plurality of ports 645 circumferentially spaced around the perimeter of the body 643 generally between the venturi 666 and the jet nozzle 660. Desirably a screen mesh or porous material 647 having a predefined porosity is attached to the perimeter of the venturi body 643 to cover the ports 645, thereby inhibiting vapor or contaminants from flowing through the ports 645 under an aspirating force created by the venturi 666.

The upper wall 622 has another opening 649 with a tubular connector 651 attached therein. Desirably, the connector 651 has a baffle or deflector 653 extending therefrom. The connector 651 has a bore 655 generally sized to be closely received on the body 643. The body 643 is preferably attached in the connector 651 so that an outlet 672 of the venturi 666 is axially spaced from an end wall 657 of the deflector 653. Accordingly, as fuel exits the outlet 672 of the venturi 666, the fuel comes into contact with the end wall 657 and is deflected generally upwardly and away from the upper wall 622 of the filter arrangement 610.

In use, high pressure fuel from the outlet 46 of the high pressure fuel pump 14 flows through the fuel line 673, into and through the jet nozzle 660, and then into and through the venturi 666, thereby creating a reduced pressure generally between the jet nozzle 660 and the venturi 666. As such, fluid, such as liquid fuel and fuel vapor, is moved through the ports 645 and combined or entrained with the fuel flowing from the high pressure fuel pump 14 through the venturi 666. Upon the liquid fuel and fuel vapor exiting the outlet 672 of the venturi 666, it contacts the end wall 657 of the deflector 653. Accordingly, the fuel vapor is caused to rise away from the filter arrangement 610 and away from the inlet 12 of the high pressure fuel pump 14. Accordingly, the high pressure fuel pump 14 takes in liquid fuel free from fuel vapor, thereby maximizing the efficiency of the high pressure fuel pump 14.

Figure 13:
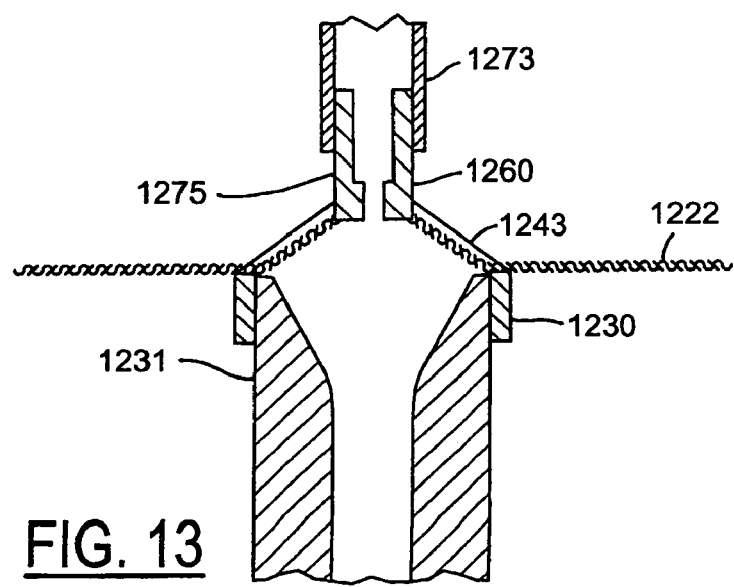
FIG. 13 is a cross-sectional side view of at least a portion of a jet pump formed integrally with a layer of filter material according to one embodiment of the invention.

It should be recognized that the venturi body 643 may be attached to the outer layer 618 of filter material other than through the use of the connector 651. For example, as shown in FIG. 13, a connector 1230 may be formed integrally with the filter material, shown here as an upper wall 1222, to facilitate the attachment of additional tubular passages, such as venturi tubes, inlet tubes, and outlet tubes, for example, for operable attachment to the upper wall 1222 of filter material. A jet nozzle 1260 may be formed integrally and as one piece with the venturi connector 1230. The jet nozzle 1260 and venturi connector 1230 are molded or otherwise connected to the upper wall 1222 of the filter material to form an integral subassembly. A plurality of axially extending ribs 1243 that extend between the jet nozzle 1260 and the venturi connector 1230 define spaces or inlets between the adjacent ribs 1243. The venturi connector 1230 is generally annular having a bore sized for attachment to an outer surface of the venturi body 1231. The jet nozzle 1260 has an outer surface 1275 sized for attachment to the fuel line 1273 for supplying high pressure fuel to the jet nozzle 1260. The upper wall 1222 of filter material is preferably molded to cover the spaces between the ribs 1243 to prevent contaminants from entering the venturi body 1231. It should be recognized, that though a jet nozzle 1260 formed as one piece with a connector ring 1231 with a plurality of ribs 1243 extending therebetween is shown being formed integrally with the filter material 1218, that any of the tubular walls and connectors discussed in the embodiments above may be formed integrally with the filter material, as desired. Otherwise, the operation of a filter assembly incorporating the molded-in jet nozzle 1260 and venturi connector 1230 functions substantially the same as described in the above embodiment, and thus, is not discussed further.

Figure 8:
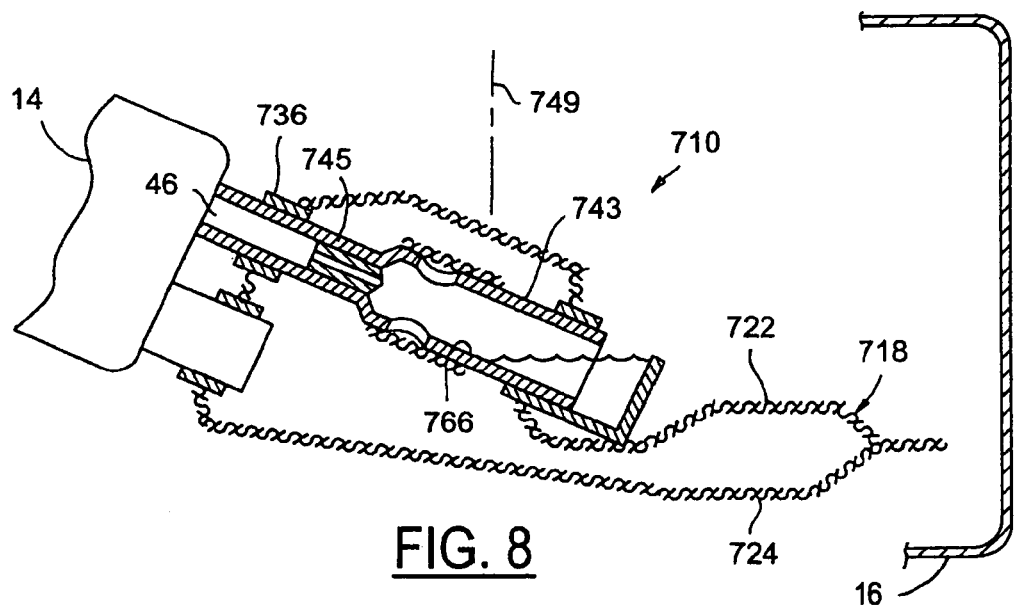
FIG. 8 is a partial cross-sectional side view of a fuel filter arrangement constructed according to an eighth embodiment of the invention.

In FIG. 8, an eighth embodiment of a filter arrangement 710 is shown with reference numerals offset by a factor of 700 being used to describe components similar to those in the embodiments already discussed. The filter arrangement 710 is similar to the embodiment described in FIG. 7 above, having an outer layer of filter material 718 with upper and lower walls 722, 724, however a venturi body 743 defining a venturi 766 is disposed in axial alignment with an outlet 46 of a high pressure fuel pump 14. Desirably, the venturi body 743 has a tubular extension or jet nozzle housing 745 formed as one piece with the body 743 in axial alignment upstream from the venturi 766. The jet nozzle housing 745 is preferably received through a jet pump connector 736 attached to the filter material and attached to the pump outlet 46. With this configuration, the filter arrangement 710 and high pressure fuel pump 14 may be inclined relative to a vertical axis 749 within a relatively shallow fuel tank 16 to enable the fuel tank and filter arrangement 710 to take on a profile having a reduced height. Otherwise, the embodiment 710 shown in FIG. 8 functions in substantially the same way as the embodiment 610 of FIG. 7, and thus is not described in detail further.

Figure 9:
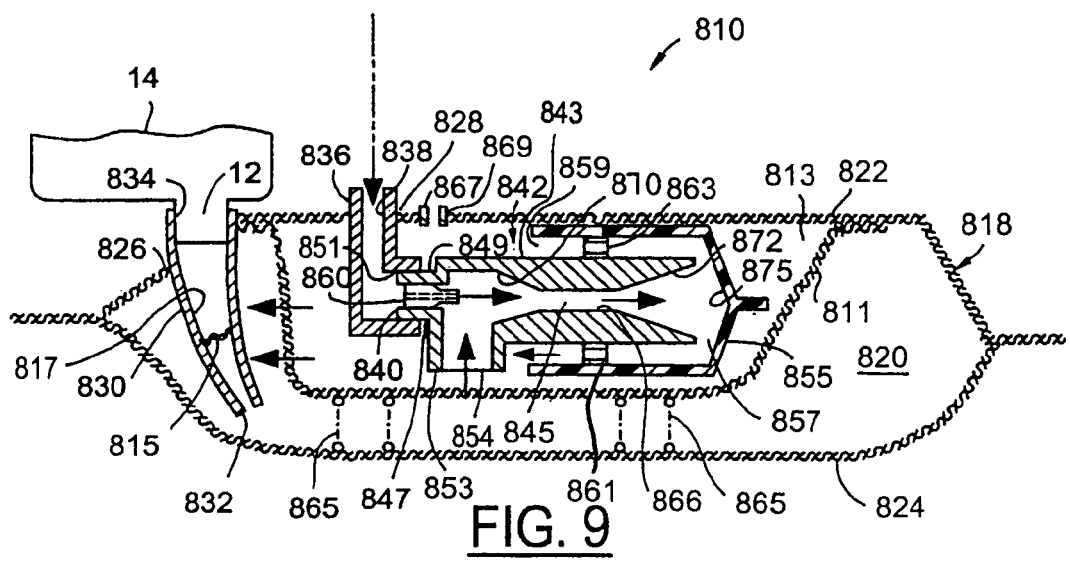
FIG. 9 is a partial cross-sectional side view of a fuel filter arrangement constructed according to a ninth embodiment of the invention.

In FIG. 9, a ninth embodiment of a fuel filter arrangement 810 is shown with reference numerals offset by a factor of 800 being used to describe components similar to those in the embodiments already discussed. The filter arrangement 810 has an outer layer 818 of porous material having an upper wall 822 and a lower wall 824 defining an outer cavity 820 therein. An inner layer 811 of porous material is attached about its perimeter 825 to one of the upper and lower walls 822, 824, shown here as the upper wall 824, to define an inner cavity 813 at least partially within the cavity 820.

The upper wall 822 has an opening 826 for receiving a tubular inlet connector 830 therethrough. The inlet connector 830 is attached to the upper wall 822, has an inlet end 832 disposed in the cavity 820, and is attached to an inlet 12 of a high pressure fuel pump 14 at its other end 834. Desirably, a porous filter, such as a screen filter 815, for example, is maintained within a through passage 817 of the inlet connector 830 generally between the inlet 832 and the outlet 834.

The upper wall 822 has another opening 828 for receiving a tubular jet pump connector 836 that is attached to the upper wall 822. An inlet end 838 of the jet pump connector 836 is preferably disposed outside the cavity 813 to facilitate attachment to a source of high pressure fuel, such as the high pressure fuel pump 14, for example. An outlet end 840 of the jet pump connector 836 is preferably disposed in the cavity 813 and is arranged for attachment to a body 843 of a jet pump 842.

The body 843 generally has a through passage 845 with a venturi 866 having an inlet 870 and an outlet 872. Desirably, the body 843 has a jet nozzle housing 847 formed as one piece with the venturi 866 and in axial alignment upstream from the venturi 866. The jet nozzle housing 847 has an outer surface 849 sized to receive the outlet 840 of the jet pump connector 836 for secure attachment of the jet nozzle housing 847 to the jet pump connector 836. The jet nozzle housing 847 also has a bore 851 sized for secure attachment of a jet nozzle 860 therein.

The jet pump 842 has an inlet 854 generally between the jet nozzle housing 847 and the venturi 866. The inlet 854 is in fluid communication with a through passage 845 in the body 843, and particularly with the fuel discharged from the jet nozzle 860. Desirably, a free end 853 of the inlet 854 abuts the inner layer 811 of permeable material, and may be attached thereto using an adhesive or a weld joint, for example.

An impermeable layer of material, referred to hereafter as a deflector 855, at least partially encapsulates the outlet 872 of the venturi 866. The deflector 855 is generally spaced inwardly from the outer and inner layers 818, 811 and outwardly from the venturi body 843 to define a partially enclosed cavity or pocket 857 generally between the deflector 855 and the body 843. The pocket 857 has a closed end 875 that facilitates redirection of the liquid fuel and fuel vapor discharged from the outlet 872 so that the liquid fuel and fuel vapor flow between the deflector 855 and the body 843 and out an opening 859 of the pocket 857. Accordingly, the venturi body 843 is received at least in part in the pocket 857 established in the inner cavity 813 so that the outlet 872 of the venturi generally faces toward the pocket 857.

Figure 9A:
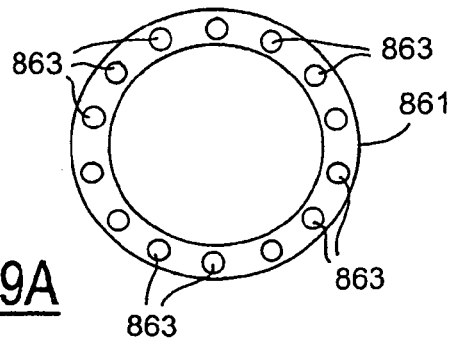
FIG. 9A is an end view of a vent from the fuel filter arrangement of FIG. 9.

To facilitate maintaining the deflector 855 in spaced relation from the body 843, a spacer ring 861 having through channels 863 (FIG. 9A) may be received between the deflector 855 and the body 843. The spacer ring 861 may be attached to the deflector 855 and/or the body 843 with an adhesive, press fit, or a weld joint, for example, to facilitate maintaining the deflector 855 in a generally fixed relation to the body 843.

To facilitate maintaining the outer layer 818 of permeable material away from the inner layer 811 of permeable material, at least one and preferably a pair of spring members 865 may be employed between the two layers 818, 811. By biasing the outer layer 818 generally away from the inner layer 811, the flow of liquid fuel within the cavity 820 is maintained to ensure that the inlet 12 of the high pressure fuel pump 14 receives an optimal liquid fuel supply.

To facilitate evacuation of fuel vapor, the outer layer 818 of permeable material has another opening 869 with a tubular vent 867 attached therein. The vent 867 is desirably located near the opening 859 between the deflector 855 and the body 843. Accordingly, any fuel vapor exiting the cavity 857 from the opening 859 is generally free to flow through the vent 867 and out of the cavity 813.

In use, high pressure fuel enters the inner cavity 813 through the jet nozzle 860. The fuel flows from the jet nozzle 860 into the venturi 866, thus, creating a reduced pressure in the area of the inlet 870 of the venturi 866. Accordingly, liquid fuel and any fuel vapor within the outer cavity 820 are aspirated through the inlet 854 into the inlet 870 of the venturi 866. The combined liquid fuel flowing from the jet nozzle 860 and the fluid entering through the inlet 854 flows through the venturi 866 and exits the outlet 872 of the venturi 866. Upon exiting the outlet 872 of the venturi 866, the liquid fuel and fuel vapor are redirected by the closed end 875 of the deflector 855 in a direction generally opposite from the direction of fuel flow through the venture 866. The fuel and any vapor then flows through the channels 863 in the spacer ring 861 to exit the opening 859 of the cavity 857. Upon exiting the cavity 857, any fuel vapors are free to rise toward the upper wall 822 of the outer layer 818 of material, and ultimately flow outwardly from the inner cavity 813 through the vent 867. The liquid fuel exiting the cavity 857 is free to flow toward the inlet 832 of the inlet connector 830 connected to the inlet 12 of the high pressure fuel pump 14. The liquid fuel is then free to enter the inlet 832 of the operating high pressure fuel pump 14. As the fuel flows through the inlet connector 830, the screen filter 815 within the inlet connector 830 ensures that any remaining fuel vapor or contamination is prevented from flowing into the inlet 12 of the high pressure fuel pump 14. Filter 815 may be disposed over inlet 832 or elsewhere on or along the connector 830. Accordingly, the high pressure fuel pump 14 is ensured of having an adequate supply of liquid fuel free of contamination and fuel vapor in use, thereby improving the running performance and efficiency of the high pressure fuel pump 14, and thus, maximizing the running performance of the engine in fluid communication with the high pressure fuel pump 14.

Figure 10:
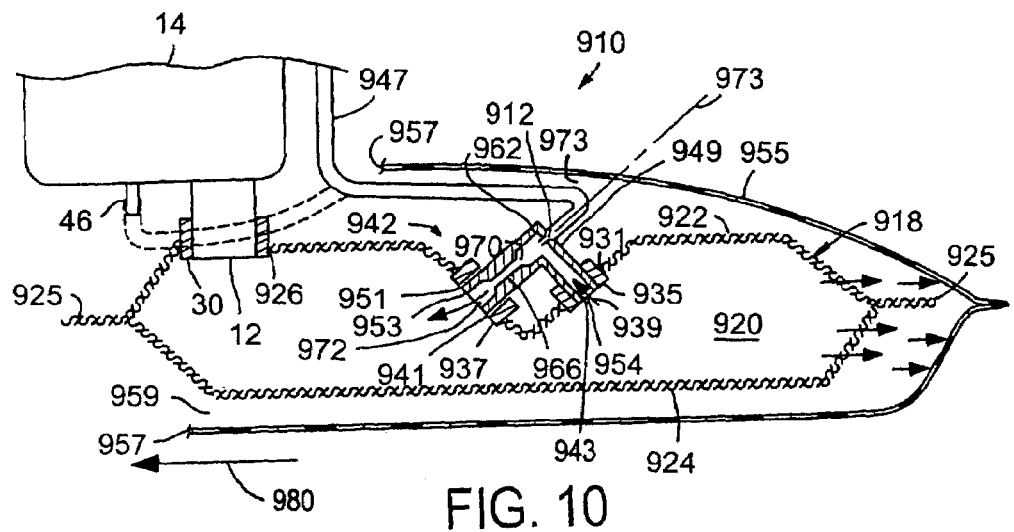
FIG. 10 is a partial cross-sectional side view of a fuel filter arrangement constructed according to a tenth embodiment of the invention.

In FIG. 10, a tenth embodiment of a filter arrangement 910 is shown with reference numerals offset by a factor of 900 being used to describe components similar to those in the embodiments already discussed. The filter arrangement 910 has an outer layer 918 of filter material having an upper wall 922 and a lower 924 wall generally attached around a perimeter 925 of the walls 922, 924 to define a cavity 920 therein. The upper wall 922 has an opening 926 with an inlet connector 30 received and attached to the upper wall 922 by an adhesive or weld joint, for example. The upper wall 922 has another pair of openings 931, 933 with a pair of tubular jet pump connectors 935, 937 attached therein. The jet pump connectors 935, 937 have bores 939, 941, respectively, with diameters generally sized for receiving a pair of free ends 943, 953 of a jet pump 942.

The jet pump 942 has one inlet 912 arranged for fluid communication via a fuel line 947 with a source of high pressure fuel, such as the high pressure fuel pump 14, for example. The fuel line 947 may originate from an auxiliary line stemming from the fuel pump 14, or for example it may be attached to an outlet 46 of the fuel pump 14, as represented in phantom line. The inlet 912 of the jet pump 942 accommodates a jet nozzle 962, as described in the embodiments above, wherein the jet nozzle 962 may be formed as one piece with the jet pump 942, or may be attached to the jet pump 942 as a separate component.

The jet pump 942 has a generally L-shaped body 943 maintained substantially outside the cavity 920. The body 943 has an outer surface 949 and a through passage defining a venturi 966. The venturi 966 has an inlet 970 arranged outside the cavity 920 in axial alignment downstream from the jet nozzle 962 and an outlet 972. The outer surface 949 adjacent the free end 953 has a diameter less than the diameter of the bore 941 to establish a preferably loose fit connection within the connector 937 generally adjacent the outer layer 918. As such, a gap 951 is preferably defined between the outer surface 949 and the connector 937. Accordingly, any fuel vapor within the cavity 920 is free to exit the cavity 920 through the gap 951, as is discussed in more detail hereafter.

The jet pump 942 has a generally tubular inlet 954 extending generally laterally from a longitudinal axis 973 of the venturi 966. The inlet 954 is arranged in fluid communication with the venturi 966 generally between the inlet 970 of the venturi 966 and the jet nozzle 962. The outer surface 949 of the inlet 954 is preferably sized for a fluid tight connection to the connector 935.

Desirably, the filter arrangement 910 has a generally impermeable layer of material, referred to hereafter as a deflector 955 encapsuling at least a portion of the outer layer 918 of filter material. The deflector 955 is preferably maintained in spaced relation to the outer layer 918 to allow liquid fuel and fuel vapor to flow generally freely between the deflector 955 and the outer layer 918. The deflector 955 has a peripheral free edge 957 providing an opening 959 for liquid fuel and fuel vapor to exit from between the outer layer 918 and the deflector 955. Desirably, the opening 959 faces toward a front end of a vehicle (not shown) as indicated by the arrow 980 incorporating the filter arrangement 910.

In use, high pressure fuel flows through the jet nozzle 962 and into the venturi 966 to establish a reduced pressure at the inlet 970 of the venturi 966. Accordingly, liquid fuel and fuel vapor is aspirated from the cavity 920 through the inlet 954 to combine with the liquid fuel flowing from the jet nozzle 962. The liquid fuel and fuel vapor then flow through the venturi 966 and out the outlet 972 of the venturi 966. Any fuel vapor flowing through the outlet 972 of the venturi 966 is then free to exit the cavity 918 through the vent gap 951. Meanwhile, the liquid fuel is preferably directed generally toward the inlet 12 of the high pressure fuel pump 14.

Further, during acceleration of the vehicle, the deflector 955 maintains liquid fuel in close proximity to the inlet 12 of the high pressure fuel pump 14. This results from the orientation of the deflector 955 preferably encapsuling the rear portion of the cavity 920. As such, the high pressure fuel pump 14 is further assured of having an adequate supply of liquid fuel to maximize the running efficiency of the pump 14, and thus, maximize the running efficiency of an engine of the vehicle.

Figure 11:
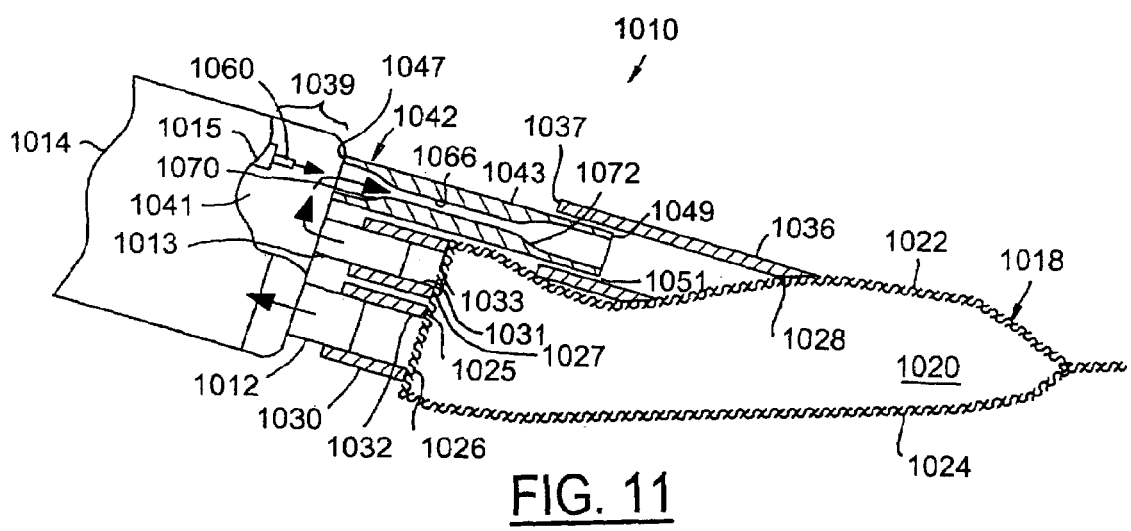
FIG. 11 is a partial cross-sectional side view with a portion broken away and showing a fuel filter arrangement constructed according to an eleventh embodiment of the invention.

As shown in FIG. 11, an eleventh embodiment of a filter arrangement 1010 is shown with reference numerals offset by a factor of 1000 being used to describe components similar to those in the embodiments already discussed. The filter arrangement 1010 has an outer layer 1018 of filter material with an upper wall 1022 and a lower wall 1024 defining a cavity 1020 therein. The upper and lower walls 1022, 1024 are attached together on one side of the cavity 1020 to form a side wall 1025. Two generally tubular inlet connectors 1030, 1031 are attached to the side wall 1025 such as by an adhesive or weld joint, for example. The inlet connectors 1030, 1031 have inlet openings 1032, 1033 preferably covered by a layer of filter material, such as a portion of outer layer 1018 of filter material, for example, to further filter any liquid fuel drawn through the connectors 1030, 1031.

The upper wall 1022 has an opening 1028 for operable attachment of a jet pump connector 1036 therein. The jet pump connector 1036 has a generally free end 1037 arranged for fluid communication with a source of high pressure fuel, such as the high pressure fuel pump 1014, for example.

The high pressure fuel pump 1014 has a base section 1039 with a pair of inlets 1012, 1013 extending longitudinally therefrom and an outlet 1015 constructed, at least in part, as a jet pump 1042. One of the inlets 1012 is arranged to route liquid fuel into the fuel pump 1014 for delivery under pressure to an engine (not shown), while the other inlet 1013 is arranged for fluid communication with the jet pump 1042 to facilitate aspirating fuel vapor from within the cavity 1020.

The base section 1039 has a generally hollowed chamber 1041 providing fluid communication between the inlet connector 1027 and the jet pump 1042, wherein the jet pump is preferably constructed, at least in part, within the base section 1039. The jet pump 1042 has a jet nozzle 1060 preferably received in the base section 1039 and in fluid communication with liquid fuel being supplied by the high pressure fuel pump 1014, and an outlet arranged generally in axial alignment with a tubular venturi body 1043 extending axially from the base section 1039. The venturi body 1043 has one end 1047 preferably attached to the base section 1039 and another end 1049 preferably sized for a loose fit connection with the jet pump connector 1036 to define a generally circumferential vent gap 1051 therebetween. The venturi body 1043 has a venturi 1066 having an inlet 1070 and an outlet 1072 in axial alignment with the jet nozzle 1060. Accordingly, the pump 1014 is arranged to both pump liquid fuel through an outlet (not shown) to a vehicle engine, and through the jet nozzle 1060 into the venturi 1066.

In use, liquid fuel is dispensed under pressure from the high pressure fuel pump 1014 through the jet nozzle 1060 and into the venturi 1066. A low pressure results at an inlet 1070 of the venturi 1066, thereby aspirating fuel vapor from within the cavity 1020 through the connector 1031. The fuel vapor then flows through the chamber 1041 to combine with the liquid fuel flowing through the venturi 1066 discharged from the jet nozzle 1060. Upon exiting the outlet 1072 of the venturi 1066, the fuel vapor tends to rise away from the outer layer 1018 of filter material through the vent gap 1051, and thus, rises away from the inlet 1012 of the high pressure fuel pump 1014. However, the liquid fuel dispensed through the outlet 1072 of the venturi 1066 is free to flow through the outer layer 1018 of liquid permeable filter material to re-enter the cavity 1020. Accordingly, any fuel vapor within the cavity 1020 is expelled from the cavity 1020, while the liquid fuel is returned to the cavity. As such, the high pressure fuel pump 1014 is ensured of having an adequate supply of liquid fuel free from fuel vapor, thereby maximizing the running efficiency of both the pump 1014 and the engine.

Figure 12:
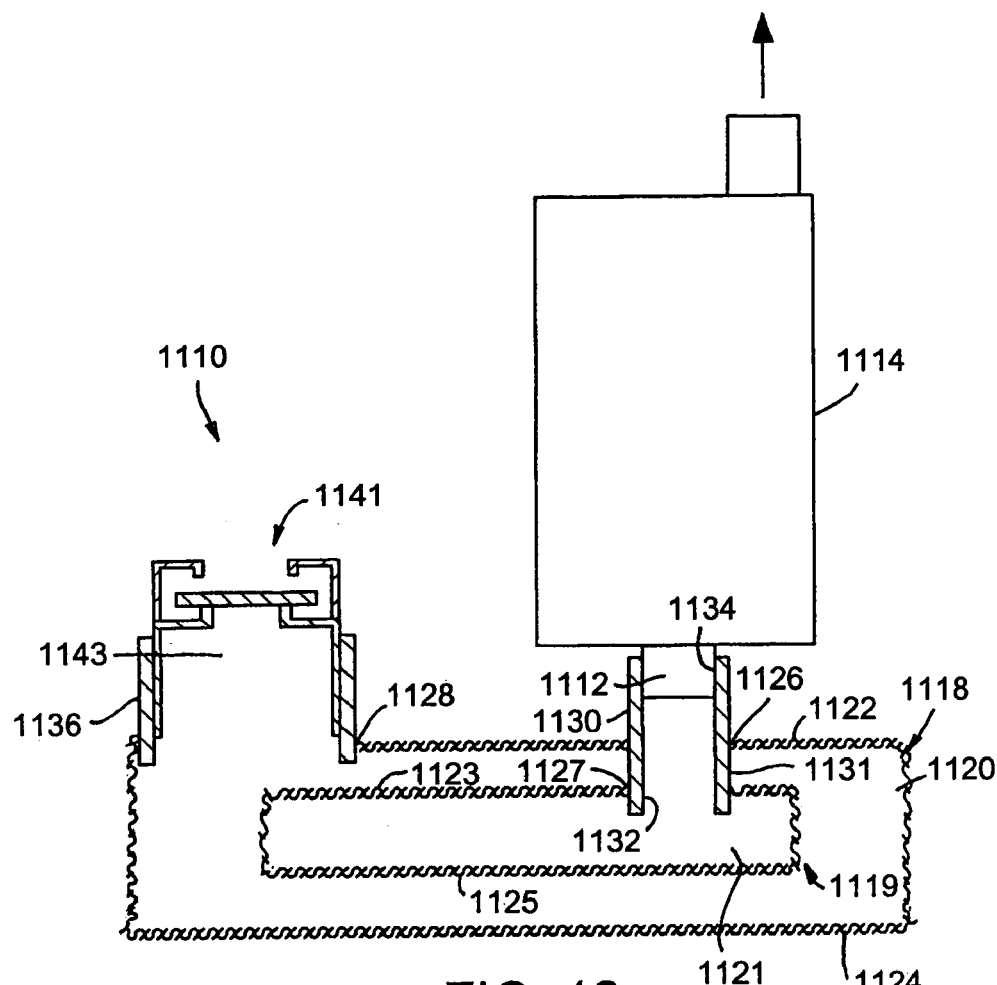
FIG. 12 is a partial cross-sectional view of a fuel filter arrangement constructed according to a twelfth embodiment of the invention.

In FIG. 12, a twelfth embodiment of a filter arrangement 1110 is shown with reference numerals offset by a factor of 1100 being used to describe components similar to those in the embodiments already discussed. The filter arrangement 1110 has an outer layer 1118 of liquid fuel permeable material having an upper wall 1122 and a lower wall 1124 defining an outer cavity 1120 therein. The upper wall 1122 has one opening 1126 for receiving an inlet connector 1130 therein and another opening 1128 for receiving a vent connector 1136 therein. Preferably, in use the opening 1128 is elevated relative to the inlet 1132 of the connector 1130. Desirably, the connectors 1130, 1136 are attached within the openings 1126, 1128, respectively, by an adhesive or weld joint, for example. The outer wall 1118 is preferably constructed from a porous material, such as a woven nylon fabric, for example, and has a predefined porosity, such as 25–35 μm, for example, generally allowing liquid fuel to flow into the outer cavity 1120.

The filter arrangement 1110 has an inner layer 1119 of liquid fuel permeable material generally spaced from the outer layer 1120 of filter material so that the inner layer 1119 is preferably substantially encapsuled by the outer layer 1118. The inner layer 1119 has an upper wall 1123 and a lower wall 1125 defining an inner cavity 1121 therein. The upper wall 1123 has an opening 1127 preferably arranged in axial alignment with the opening 1126 in the outer layer 1118. The inlet connector 1130 extends from the opening 1126 through the opening 1127 and presents an inlet opening 1132 within the inner cavity, and an outlet opening 1134 generally outside the outer cavity 1120. The connector 1130 is attached to the inner layer 1119. With the inlet connector 1130 extending between the openings 1126, 1127, a tubular wall 1131 presents a generally continuous impermeable barrier to fuel within the outer cavity 1120. Accordingly, the preferred path for fuel flow out of the inner cavity 1121 is through the inlet opening 1132 within the inner cavity 1121. As such, any liquid fuel exiting the inner cavity 1121 to the inlet 1112 of a high pressure fuel pump 1114, for example, is filtered twice before entering the high pressure fuel pump 1114. Desirably, the inner wall 1119 is generally constructed from a porous material, such as a woven nylon fabric, for example, and has a predefined porosity generally greater than the porosity of the outer layer 1118, such as 70–100 μm, for example, thereby allowing liquid fuel to flow into the inner cavity 1121, while inhibiting any fuel vapor and contaminants from flowing into the inner cavity 1121.

Though the upper and lower walls 1123, 2225 of the inner layer 1119 are generally spaced from the upper and lower walls 1122, 1124 of the outer layer 1120, desirably, the lower wall 1125 of the inner layer 1119 is maintained in close proximity to the lower wall 1124 of the outer layer 1120. As such, the inner layer 1119, and particularly the lower wall 1125 acts as a wick to attract any liquid fuel within the fuel tank of the vehicle. Accordingly, the filter arrangement 1110 attracts any liquid fuel within the fuel tank generally toward the inlet 1112 of the high pressure fuel pump 1114 to ensure optimal efficiency of the fuel system.

The filter arrangement has a vent valve constructed as a flapper valve, a ball valve, or even a jet pump, for example, shown generally at 1141. The vent valve 1141 is generally constructed for receipt in the vent connector 1136, and preferably acts as a one way valve to allow fuel vapor to exit the outer cavity 1120, while inhibiting liquid fuel from entering the outer cavity 1120 therethrough. This ensures that any liquid fuel within the outer cavity 1120 has been filtered through the outer layer 1118 of filter material prior to entering the outer cavity 1120. With the opening 1128 being generally elevated from the inlet opening 1132, a vapor dome 1143 is established adjacent the opening 1128 for any fuel vapor within the outer cavity 1118.

In use, liquid fuel flows through the outer and inner layers 1118, 1119, of filter material, respectively. As liquid fuel passes through the outer layer 1118, some fuel vapor may be created within the outer cavity 1120. However, as the fuel vapor is drawn toward the inner layer 1119 of filter material, the porosity of the inner layer 1119 inhibits any fuel vapor from entering the inner cavity 1121, but allows the liquid fuel to flow into the inner cavity 1121. Any fuel vapor obstructed from flowing into the inner cavity 1121 by the inner layer 1121 tends to migrate toward the vapor dome 1143 adjacent the one way vent valve 1141. Accordingly, as the pressure increases within the outer cavity 1120, the fuel vapor exits the vent valve 1141. As such, the high pressure fuel pump 1114 receives generally vapor free, twice filtered, liquid fuel to pump to an engine of a vehicle.

It should be recognized that upon reading the disclosure herein, that one ordinarily skilled in the art would readily recognize other embodiments than those disclosed herein, with those embodiments being within the scope of the claims that follow. Accordingly, the disclosure herein is intended to be exemplary, and not limiting. The scope of the invention is defined by the following claims.

We claim:

1. A fuel filter arrangement for use in a fuel tank of a vehicle, comprising:
    an outer layer of permeable material defining a substantially enclosed cavity with at least one opening passing through the outer layer;
    a tubular connector extending through one of the openings and having an inlet located in the cavity and an outlet located outside the cavity; and
    a jet nozzle generally adjacent the cavity having an inlet for receiving fuel under pressure and an outlet for dispensing fuel, the dispensed fuel inhibiting fuel vapor from entering the inlet of the tubular connector.

2. The fuel filter arrangement of claim 1 further comprising a venturi in axial alignment with the jet nozzle downstream from the jet nozzle.

3. The fuel filter arrangement of claim 2 wherein the venturi is in fluid communication with the cavity.

4. The fuel filter arrangement of claim 3 wherein the venturi is attached to the outer layer.

5. The fuel filter arrangement of claim 4 wherein the venturi has an outlet outside the cavity.

6. The fuel filter arrangement of claim 2 wherein the outer layer has a lower wall with an opening for receiving the venturi in axial alignment with the jet nozzle.

7. The fuel filter arrangement of claim 6 wherein the venturi is attached in the opening in the lower wall.

8. The fuel filter arrangement of claim 2 wherein the venturi is generally L-shaped with the venturi having a longitudinal axis and having an inlet extending generally laterally from said longitudinal axis and in fluid communication with the jet nozzle.

9. The fuel filter arrangement of claim 8 wherein the inlet abuts the outer layer.

10. The fuel filter arrangement of claim 8 further comprising a tubular connector attached in an opening in the outer layer and wherein the venturi has a free end arranged for a loose fit connection within the connector.

11. The fuel filter arrangement of claim 8 further comprising a tubular extension extending from the venturi to a free end arranged for operable connection with an outlet of the high pressure fuel pump.

12. The fuel filter arrangement of claim 11 wherein the jet nozzle is received in the tubular extension upstream from the venturi.

13. The fuel filter arrangement of claim 11 wherein the tubular extension passes through outer layer of material.

14. The fuel filter arrangement of claim 8 further comprising a substantially impermeable layer of material at least in part encapsulating the venturi.

15. The fuel filter arrangement of claim 8 wherein the venturi is outside the cavity defined by the outer layer of material.

16. The fuel filter arrangement of claim 15 further comprising a tubular connector attached to the outer layer of material, the connector having an inner diameter, the venturi having an outer diameter less than the inner diameter of the connector and being received in the inner diameter of the connector to establish a loose fit connection between the venturi and the connector.

17. The fuel filter arrangement of claim 2 further comprising an inner layer of permeable material defining another substantially enclosed cavity in the cavity defined by the outer layer of material, the venturi being received in the cavity defined by the inner layer of material.

18. The fuel filter arrangement of claim 17 wherein the inlet terminates in a free end abutting the inner layer of material.

19. The fuel filter arrangement of claim 17 further comprising a substantially impermeable layer of material defining a pocket having a closed end within the cavity defined by the inner layer of material, the venturi being received at least in part in the pocket.

20. The fuel filter arrangement of claim 19 wherein the venturi has an outlet facing generally toward the closed end of the pocket.

21. The fuel filter arrangement of claim 2 further comprising a tubular connector attached to an opening in the outer layer, the connector having an inner diameter, the venturi having an outer diameter less than the inner diameter of the connector and being received in the inner diameter of the connector to establish a loose fit connection between the venturi and the connector.

22. The fuel filter arrangement of claim 21 further comprising another tubular connector attached to another opening in the outer layer of material.

23. The fuel filter arrangement of claim 1 wherein the jet nozzle is carried in the cavity.

24. The fuel filter arrangement of claim 1 wherein the outer layer has an upper wall and a lower wall with at least one of the openings passing through the upper wall and receiving the tubular connector.

25. The fuel filter arrangement of claim 1 further comprising an inner layer of permeable material defining another substantially enclosed cavity separate from the cavity defined by the outer layer of material.

26. The fuel filter arrangement of claim 25 further comprising a vent received in the outer layer of material allowing fuel vapor to flow outwardly from said another cavity.

27. The fuel filter arrangement of claim 25 wherein the inner layer is spaced from the outer layer and fully encapsulated by the outer layer of material.

28. The fuel filter arrangement of claim 25 wherein the inner layer has an outer perimeter, the inner layer being attached to the outer layer generally adjacent the outer perimeter.

29. The fuel filter arrangement of claim 25 wherein the jet nozzle is carried in said another substantially enclosed cavity.

30. The fuel filter arrangement of claim 25 wherein the inner layer is biased away from the outer layer by a spring.

31. The fuel filter arrangement of claim 25 wherein the inner layer and outer layer are constructed from a woven material, the outer layer having one average porosity and the inner layer having another average porosity that is greater than the average porosity of the outer layer.

32. The fuel filter arrangement of claim 25 further comprising a substantially impermeable layer of material spaced from the inner layer and defining a pocket in the cavity defined by the inner layer.

33. The fuel filter arrangement of claim 32 further comprising a venturi in axial alignment with the jet nozzle downstream from the jet nozzle.

34. The fuel filter arrangement of claim 33 wherein the venturi is received at least partially in the pocket.

35. A fuel filter for use inside a fuel tank, comprising:
an outer layer of permeable material defining a substantially enclosed outer cavity and having a pair of openings through the outer layer; and
an inner layer of permeable material defining a substantially enclosed inner cavity, the inner cavity being substantially enclosed by the outer cavity with one of the openings extending into the inner cavity.

36. The fuel filter of claim 35 further comprising a tubular connector extending through the one opening into the inner layer and having an inlet in fluid communication with the inner cavity.

37. The fuel filter of claim 36 wherein the tubular connector presents a continuous impermeable barrier to fuel within the outer cavity.

38. The fuel filter of claim 35 further comprising a vent received in an opening in the outer layer, the vent allowing fuel vapor within the outer cavity to flow out of the outer cavity while preventing liquid fuel from entering the outer cavity through the vent.

39. The fuel filter of claim 38 wherein the vent comprises a jet nozzle having an inlet for receiving fuel under pressure and an outlet for discharging fuel under pressure.

40. The fuel filter of claim 39 further comprising a venturi having an inlet receiving the fuel at least in part discharged from the outlet of the jet nozzle and fuel vapor from the outer cavity.

41. The fuel filter of claim 35 wherein the inner layer is constructed as a woven material having a porosity sized to allow liquid fuel to flow from the outer cavity into the inner cavity and sized to inhibit vapor bubbles from flowing into the inner cavity.

42. The fuel filter of claim 35 wherein the outer layer is constructed as a woven material having one porosity and the inner layer is constructed as a woven material having another porosity, said one porosity being less than said another porosity.

43. The fuel filter of claim 35 further comprising a connector and a filter material within the connector.

44. The fuel filter of claim 35 wherein at least a portion of the inner layer is located substantially at a lowermost point of the outer layer.

* * * * *